(12) United States Patent
Moser et al.

(10) Patent No.: US 11,435,591 B2
(45) Date of Patent: Sep. 6, 2022

(54) APPARATUS FOR COLLIMATING A LIGHT RAY FIELD

(71) Applicant: FISBA AG, St. Gallen (CH)

(72) Inventors: Hansruedi Moser, Hinterforst (CH); Eckhard Langenbach, Speicherschwendi (CH); Romedi Selm, Wittenbach (CH)

(73) Assignee: FISBA AG, St. Gallen (CH)

( * ) Notice: Subject to any disclaimer, the term of this patent is extended or adjusted under 35 U.S.C. 154(b) by 0 days.

(21) Appl. No.: 17/255,099

(22) PCT Filed: Apr. 29, 2019

(86) PCT No.: PCT/EP2019/060867
§ 371 (c)(1),
(2) Date: Dec. 22, 2020

(87) PCT Pub. No.: WO2020/020499
PCT Pub. Date: Jan. 30, 2020

(65) Prior Publication Data
US 2021/0271097 A1 Sep. 2, 2021

(30) Foreign Application Priority Data
Jul. 23, 2018 (EP) ..................... 18184916

(51) Int. Cl.
*G02B 27/30* (2006.01)
*G02B 27/09* (2006.01)
(52) U.S. Cl.
CPC ..... *G02B 27/0961* (2013.01); *G02B 27/0966* (2013.01); *G02B 27/30* (2013.01)
(58) Field of Classification Search
CPC .. G02B 27/30; G02B 27/0966; G02B 27/961; G02B 3/04
See application file for complete search history.

(56) References Cited

U.S. PATENT DOCUMENTS 4,318,594 A 3/1982 Hanada
6,809,754 B2 10/2004 Riepenhoff
(Continued)

FOREIGN PATENT DOCUMENTS

DE 602 10 010 T2 10/2006
EP 1 211 066 A2 6/2002
(Continued)

OTHER PUBLICATIONS

European Search Report Corresponding to 18184916 dated Jan. 25, 2019.
(Continued)

*Primary Examiner* — Ryan D Howard
(74) *Attorney, Agent, or Firm* — Finch & Maloney PLLC; Jay S. Franklin; Michael J. Bujold

(57) ABSTRACT

An apparatus (100) for collimating a light ray field (1), a diode laser, the use of a collimation lens system (1), a collimation method and a method of producing a collimation apparatus. The apparatus (100) collimates a light ray field (L), which diverges more quickly in a first direction (F), perpendicular to the emission direction(s), than in a second direction (S), perpendicular to both the emission direction(s) and the first direction (F). The apparatus (100) comprises at least one first collimation lens system (1) for collimating the light ray field (L) in the first direction and at least one second collimation lens system (2) for collimating the light ray field in the second direction. The first collimation lens system (1) comprises a glass cylindrical lens (3) with an at least partly circular profile (4). The first collimation lens system (1) comprises an aspherical plastic lens element (5).

24 Claims, 5 Drawing Sheets

(56) References Cited

U.S. PATENT DOCUMENTS 6,873,640 B2 3/2005 Bradburn et al.
2012/0027417 A1 2/2012 Santori et al.

FOREIGN PATENT DOCUMENTS

EP 3 267 233 A2 10/2018
WO 2018/125830 A1 7/2018

OTHER PUBLICATIONS

International Search Report Corresponding to PCT/EP2019/060867 dated Jul. 10, 2019.
Written Opinion Corresponding to PCT/EP2019/060867 dated Jul. 10, 2019.

APPARATUS FOR COLLIMATING A LIGHT RAY FIELD

The invention relates to a device for collimating a light beam field, a diode laser, the use of a collimating lens system, a method for collimating and a method for manufacturing a device for collimating.

Devices for collimating a light beam field are used, for example, for light emitters with an asymmetric beam field and are used, among other things, in diode lasers and high-power diode lasers.

A high-power diode laser is a semiconductor laser with a broad stripe structure to enable the emission of high power as a light beam in the watt range. The high-power diode laser comprises a number of single emitters.

Such a single emitter generates a light beam field from an original plane with a predetermined direction of emission relative to this plane. With respect to the direction of emission, the light beam field diverges more quickly in a first direction (fast axis) perpendicular to the direction of emission than in a second direction (slow axis) perpendicular to the direction of emission and the first direction.

It is known from the state of the art to realise a radiation field as symmetric as possible with separate collimation in fast axis and slow axis direction.

Especially for systems with rather large beam diameters, a slow-axis collimation can first be carried out with a cylindrical collimating lens SAC (Slow Axis Collimator), or with a number of collimating lenses arranged in a slow-axis array.

Afterwards a Fast Axis Collimation with a collimating on lens FAC (Fast Axis Collimator) is carried out.

To correct aperture errors, especially for Fast Axis Collimation, cylindrical lenses with a non-circular profile are usually used.

Lenses with freeform surfaces, i.e. with aspherical and non-circular surface profile, are preferably made of plastic, as they can be produced at low cost, for example by injection moulding, as revealed for example in the WO2018/125830.

Depending on the application of the device, the collimation device is subject to temperature fluctuations, for example when used in a LIDAR system operating at ambient temperatures. A temperature stability between −40° C. and +85° C. to +105° C. are required. With a LIDAR system, the distance to a visible surface can be measured by emitting light and analysing the properties of the reflected light, for example the "flight time" of a light pulse.

Most materials have properties that change with temperature. The relative expansion and contraction of a material due to temperature changes is determined by the coefficient of thermal expansion of a material, $\alpha$, which is usually given in the unit $10^{-6}$ K$^{-1}$.

There are two relevant properties to consider for optical performance: thermal expansion, i.e. the coefficient of thermal expansion $\alpha$, and the way the refractive index changes with temperature (dn/dT). The refractive index n is a material-specific quantity and depends on the wavelength.

The refractive index influences the refractive power of a lens. The higher the refractive index, the stronger the refractive power of the lens.

The refractive power also depends on the curvature of the lens, which is also dependent on temperature, as is the coefficient of thermal expansion $\alpha$.

Due to the change of the refractive index with temperature (dn/dT) and the expansion of the material, it can therefore be thermal defocusing, i.e. a change of the focus position on the axis.

For a device mounted in a housing with a coefficient of thermal expansion $\alpha_r$, the change in focus position is a combination of the change in focal length of the lens systems and the change in image plane position due to the expansion of the housing. If the change in housing length is equal to the shift of the image plane due to the lens systems, then the defocusing is zero and the system is considered to be athermal.

The defocusing can be compensated mechanically, whereby the lenses can be shifted within the housing, but this requires additional components and can be very costly.

Especially in systems with a long focal length, such as those used in LIDAR systems to achieve a sufficient beam cross section, the focus position is difficult to compensate for temperature due to the relatively large overall length.

It is also known from EP 3 267 233 A2, for example, that thermal stability can be achieved with glass lenses.

However, the production of glass lenses with free-form surfaces is very costly, especially for larger designs.

Therefore, the task is to provide a device for collimation, a diode laser, a collimating lens system and a method for collimating a light beam field, which overcome the disadvantages of the prior art and with which an athermal collimation as far as possible is made possible at low cost.

The object is achieved by a device for the collimation of a light beam field which diverges faster in a first direction perpendicular to the direction of emission (Fast Axis) than in a second direction (Slow Axis) perpendicular to the direction of emission and to the first direction. The device comprises at least one first collimation lens system (Fast Axis Collimator FAC) for collimating the light beam field in the first direction and preferably at least one second collimation lens system (Slow Axis Collimator SAC) for collimating the light beam field in the second direction.

The first collimation lens system comprises a cylindrical lens made from glass.

The first collimation lens system also includes an aspherical lens element made of plastic. The plastic material is in particular polycarbonate, Zeonex T62R or Zeonox E48R.

The cylindrical lens made from glass preferably has an easy to manufacture profile, especially an at least partially circular profile. This means that the contour of a cross section perpendicular to the cylinder axis corresponds at least partially to the contour of a circle or pitch circle. Along the optical axis, the cylindrical lens can have a circular profile with a first radius and a first direction of curvature on one side and a circular profile with a second radius and a second direction of curvature on the opposite side.

A plano-convex lens with a plane entrance side and an exit side with constant convex curvature is preferred in order to achieve the most cost-effective production possible.

The cylindrical lens made from glass can therefore be produced with conventional manufacturing methods, for example with simple grinding and polishing under full surface contact.

Glass can be K-VC40 from Sumita or S-LAH64 from Ohara. At 20° C., these glasses have imaging properties that correspond to those of a plastic lens, but have a considerably more stable temperature behaviour.

A circular cylindrical glass lens alone is not capable of collimating the light beam field in the fast axis direction with sufficient quality, especially with larger beam diameters. The aperture error is too large. For example, a plano-convex, circular cylindrical lens with focal length f=32 mm and numerical aperture NA=0.39 shows an aperture error of 65$\lambda$, which is not acceptable for many applications.

If the spherical aberration is to be corrected with a glass lens, it would have to be produced in a complex and cost-intensive process, for example with precision molding.

The correction necessary for Fast Axis collimation as opposed to collimation with a cylindrical lens with at least a partially circular profile is, according to the invention, performed with the lens element made from plastic. For this purpose, the plastic lens element has a free-form surface with a non-circular profile.

The first collimation lens system therefore has an optical performance sufficient for fast axis collimation even with larger beam diameters, e.g. larger than 20 mm, and consists to a large extent of glass, which favours thermal stability, but is nevertheless favourable in production, as the glass does not require complex processing.

In an advantageous version of the invention, the device has a second collimation lens system for collimating the light beam field in the second direction.

The second collimation lens system comprises at least one cylindrical lens, preferably with an at least partially circular profile. The second collimation lens system comprises in particular a cylindrical lens array.

The second collimation lens system is preferably arranged in front of the first collimation lens system in the direction of radiation.

The cylindrical lens array for slow-axis collimation can include cylindrical lenses with a circular profile. The cylindrical lenses for slow-axis collimation have much smaller diameters and shorter focal lengths than the lenses for fast-axis collimation, so the second collimation lens system is not as susceptible to thermal instability. In addition, the requirements for collimation properties are much lower in the slow-axis direction.

The cylindrical lens array can be made of glass or plastic, for cost reasons plastic is often preferred.

The cylindrical lens array can, for example, comprise 10 cylindrical lenses arranged parallel to each other with the respective cylinder axes next to each other. These are preferably used to symmetrise a light field emitted by 10 laser diode chips.

The aspherical lens element made of plastic is preferably arranged in the direction of emission after the cylindrical lens made of glass.

In an advantageous advanced embodiment, the device includes a further optical element which is arranged in the direction of emission after the cylindrical lens made of glass.

The further optical element can be used to homogenise the far field, especially in the direction of the slow axis.

The further optical element may have a surface on the side facing away from the cylindrical lens which serves to homogenise the light beam field.

The further optical element can comprise a lens array in which, for example, concave and convex areas alternate and merge into one another, with the profile curves being continuously differentiable everywhere.

The other optical element can also have a flat surface on the side facing away from the cylindrical lens made of glass and the side facing the cylindrical lens has alternating concave and convex areas.

The other optical element is preferably made of plastic.

In a preferred embodiment of the invention, the optically effective surface of the aspherical lens element faces the cylinder lens. Optically effective is meant here with regard to the collimation of the light beam field in the fast axis direction.

The aspherical lens element can be formed as an integral part of the other optical element. In this case, the side facing the cylindrical lens serves for collimation, which is designed as a free-form surface, and the side facing away from the cylindrical lens serves for homogenisation and can have alternating convex and concave areas.

In principle, it is also possible to carry out homogenisation with the side facing the cylindrical lens and collimation with the side facing away from the cylindrical lens.

The number of components can thus be limited, which has a positive effect on assembly and weight.

The other optical element is preferably produced in an injection moulding process and in an injection mould.

The free-form surface of the aspherical, cylindrical lens element, in particular the surface of the other optical element facing the glass cylindrical lens, has a contour which can be described by the following formula:

$$z(x) = \frac{\frac{x^2}{R}}{1 + \sqrt{1 - (1+k)\frac{x^2}{R^2}}} + \sum_{n=1}^{N} A_n \cdot x^n$$

Here, x denotes the coordinate axis, which is perpendicular to the direction of propagation of the light, i.e. to the optical axis, and to the cylinder axis. The coordinate x thus indicates the distance from a point on the aspherical curve in the direction of the x-coordinate. z denotes the depth of the aspherical surface (i.e. a perpendicular distance between the point on the aspherical surface spaced by the distance x from the plane of symmetry of the cylindrical lens formed by the cylinder axis and the direction of propagation and a tangential plane tangential to a vertex of the aspherical surface on the optical axis), R the radius of curvature of the surface of the optical element near the optical axis, k the conic constant and $A_i$ aspherical coefficients.

For example, $k=-1, A_1=0, A_3=0, A_i=0$ can be selected for $i>4$.

Especially preferred are at least the parameter R and $A_4$ not zero. The surface of the aspherical lens element made of plastic, in contrast to the cylindrical lens made of glass, therefore does not have a circular profile and can correct opening errors.

In a preferred embodiment of the invention, the device comprises a mount in which the first collimation lens system is mounted. In particular, the second collimation lens system is enclosed in the same mount.

Preferably the mount comprises parts made of zinc diecast or plastic, in particular a composite plastic with embedded fibres, for example PPS Durafide 6150T6 or Ryton R-7-190BL.

In a preferred embodiment of the invention, the coefficient of thermal expansion $\alpha_t$ of the mount is equal to the coefficient of thermal expansion $\alpha_f$ of the first collimating lens system. In this case the collimating system can be considered as athermal.

The second collimating system can be placed in the same mount. However, it does not need to be taken into account in the calculation, as it is comparatively insensitive to a shift in the focal position.

According to the invention, the first collimation lens system consists of at least the cylindrical lens made of glass and the aspherical lens element made of plastic.

The coefficient of thermal expansion of the collimating lens system thus depends at least on the two components.

In principle, the focal length of a system consisting of several thin individual lenses, whose distance is smaller than the focal length, can be calculated with the following empirical formula:

$$\frac{1}{f} = \sum_i \frac{1}{f_i}$$

Where f is the effective focal length of the entire system and $f_i$ is the focal length of the individual lenses. Alternatively, the refractive power, i.e. the inverse of the focal lengths, is also calculated.

$$p = \frac{1}{f},$$
$$p_i = \frac{1}{f_i},$$
$$p = \Sigma_i p_i.$$

The temperature coefficient of the lenses can be defined by the temperature dependence of the refractive power or by the temperature dependence of the focal lengths. These have the following relationship for the single lens:

$$\alpha_p = \frac{1}{p}\frac{\partial p}{\partial T} = f\frac{\partial p}{\partial T} = -\frac{1}{f}\frac{\partial f}{\partial T} = -\alpha_f$$

The following applies analogously to the overall system $$\alpha_p = \frac{1}{p}\frac{\partial p}{\partial T} = f\frac{\partial p}{\partial T} = -\frac{1}{f}\frac{\partial f}{\partial T} = -\alpha_f$$

or also $$\alpha_p = \frac{1}{p}\frac{\partial p}{\partial T} = \frac{1}{p}\frac{\partial (\Sigma_i p_i)}{\partial T} = \frac{\Sigma_i \frac{\partial p_i}{\partial T}}{p} = \frac{\Sigma_i \alpha_{pi} \cdot p_i}{\Sigma_i pi} = \frac{-\Sigma_i \alpha_{fi} \cdot p_i}{\Sigma_i pi}.$$

The thermal expansion coefficient is therefore the weighted average of the corresponding thermal expansion coefficients of the individual lenses.

A thin multiline system becomes athermal if the coefficient of thermal expansion $\alpha_f$ is equal to the coefficient of thermal expansion $\alpha_t$ of the enclosure:

$$\alpha_t = -\alpha_p = \alpha_f.$$

For a system with two lenses and a housing made of specified materials with known coefficients of thermal expansion, the respective focal lengths or refractive powers can be determined using the following system of equations:

$$\frac{p_1}{p} = \frac{\alpha_{f2} - \alpha_t}{\alpha_{f2} - \alpha_{f1}}$$
$$\frac{p_2}{p} = \frac{\alpha_t - \alpha_{f1}}{\alpha_{f2} - \alpha_{f1}}.$$

These calculations represent a first approximation, in which no wavelength dependence is yet considered.

For example, a collimation lens system with two lenses is to be created, which should have a total focal length of 30 mm. The first lens should be made of glass, for example CDGM H-ZF2, which has a temperature expansion coefficient $\alpha_{f1} = 8.1 \cdot 10^{-6} K^{-1}$. The second lens shall be made of plastic, for example polycarbonate, which has a coefficient of thermal expansion $\alpha_{f2} = 250.5 \cdot 10^{-6} K^{-1}$. As a frame material, for example, zinc with a coefficient of thermal expansion $\alpha_t = 27 \cdot 10^{-6} K^{-1}$ should be used.

This results in a refractive power of 0.031 mm$^{-1}$ or a focal length of 32.5 mm for the first lens and 0.002599 mm$^{-1}$ or a focal length of 384.8 mm for the second lens.

Conversely, the appropriate material with the corresponding coefficient of thermal expansion can be found for a given focal length.

The focal lengths result in the radii of curvature at the vertices. In a further step, the corrections for the aspherical lens made of plastic to minimise the aperture error are determined.

Corresponding calculations can also be made for more lenses and for lenses that are not considered thin and whose thicknesses and distances can no longer be considered small compared to the focal lengths.

Corrections must also be made for larger lens diameters, especially if the refractive power varies with distance from the optical axis.

For the corrections, for example, the course of marginal rays at a distance from the optical axis is taken into account.

Preferably, the cylindrical lens made of glass has a focal length of more than 30 mm. The aspherical lens element preferably has a focal length of more than 200 mm.

The task is also solved by a diode laser, especially for a LIDAR system, which comprises a laser diode and a device as described above.

Preferably the diode laser comprises several laser diodes. The task is further solved by using a collimating lens system comprising a cylindrical lens made of glass and an aspherical lens element made of plastic for fast axis collimation of a light beam field of at least one laser diode.

The cylindrical lens preferably has an at least partially circular profile and can therefore be manufactured cost-effectively using conventional methods. The aspherical lens element made of plastic is preferably designed as a cylindrical lens with a non-circular profile.

The object is also achieved by a process for collimating a light beam field. With respect to the direction of emission, the light beam field diverges more quickly in a first direction (Fast Axis) perpendicular to the direction of emission than in a second direction (Slow Axis) perpendicular to the direction of emission and the first direction. The light beam field is collimated by at least one first collimation lens system in the first direction and preferably collimated by at least one second collimation lens system in the second direction.

The first collimation lens system comprises a cylindrical lens, in particular with an at least partially circular profile, which is made of glass. The first collimation lens system further comprises an aspherical lens element made of plastic. The aspherical lens element made of plastic is preferably a cylindrical lens with a non-circular profile.

The object is further achieved by a method of manufacturing a device for collimating a light beam field, in particular a device as described above. With respect to the direction of emission, the light beam field diverges more quickly in a first direction perpendicular to the direction of emission than in a second direction perpendicular to the direction of emission and the first direction. The procedure comprises the following steps. First of all, at least one first collimation lens system is created for collimating the light beam field in the first direction, the first collimation lens system comprising a cylindrical lens, in particular with an at least partially circular profile, which is made of glass, and an aspherical lens element which is made of plastic. Subsequently, the collimation lens system is mounted in a mount.

The materials of the cylindrical lens and the aspherical lens element are selected so that a desired total focal length is obtained for a given frame material. The system of frame and collimation lens system should be athermal.

A large part of the refraction should take place through the cylindrical lens made of glass.

The profile of the aspherical lens element is determined in such a way that the aperture error is sufficiently small.

In the following, the invention is explained in more detail in design examples using drawings. Here show FIG. 1 a schematic representation of a diode laser according to the invention in a first side view;

FIG. 2 a schematic representation of the diode laser according to the invention in a second side view;

FIG. 3 a schematic representation of a device of the invention in a first perspective view;

FIG. 4 a second perspective view of the device according to the invention;

FIG. 5 a third perspective view of the device according to the invention;

FIG. 6 a schematic representation of another optical element in side view;

FIG. 7 a detailed view X from FIG. 6.

FIG. 1 shows a schematic representation of a diode laser 110 with a device 100 according to the invention in a first side view, FIG. 2 shows a schematic representation of the diode laser 110 according to the invention in a second side view perpendicular to it.

The diode laser 110 comprises several laser diodes 120.

The device 100 serves to collimate a light beam field L, which diverges more quickly with respect to the direction of emission s in a first direction F (see FIG. 1) perpendicular to the direction of emission s than in a second direction S (see FIG. 2) perpendicular to the direction of emission s and to the first direction F.

The device 100 comprises a first collimation lens system 1 for collimating the light beam field L in the first direction F and a second collimation lens system 2 for collimating the light beam field L in the second direction S.

The first collimation lens system 1 comprises a cylindrical lens 3 with an at least partially circular profile 4, which is made of glass.

The first collimation lens system 1 also comprises an aspherical lens element 5, which is made of plastic. The aspherical lens element 5 is arranged in the direction of emission s after the cylindrical lens 3 made of glass.

As can be seen in FIG. 2, the device 100 has a second collimation lens system 2 for collimating the light beam field in the second direction S, which comprises a cylindrical lens array 6 and which is preferably arranged in front of the first collimation lens system 1 in the direction of emission s.

The device 100 comprises a further optical element 7, which is arranged after the cylindrical lens 3 in the direction of emission s. The optical element 7 has a surface 8 on the side facing away from the cylindrical lens 3, which has a profile 9 which serves to homogenise the light beam field in the slow-axis direction, see also FIGS. 6 and 7.

The aspherical lens element 5 is an integral part of the optical element 7. The optically active surface 14 of the aspherical lens element 5 is formed on the side 10 of the optical element 7 facing the cylindrical lens 3.

The optically active surface 14 is formed as a freeform surface and can be described with the formula $$z(x) = x^2/2R + A_2 x^2 + A_4 x^4 + A_6 x^6$$

For a first collimation lens system 1 with a cylindrical lens 3 made of CDGM H-ZF2 glass and an aspherical lens element 5 made of the plastic Zeonex E48R, the following parameters are selected as examples:

R=125.6 mm, $A_2$=0, $A_4$=−5.8E-6, $A_6$=−8.0E-9.

The focal length of aspherical lens element 5 is 240 mm.

Figure 1:
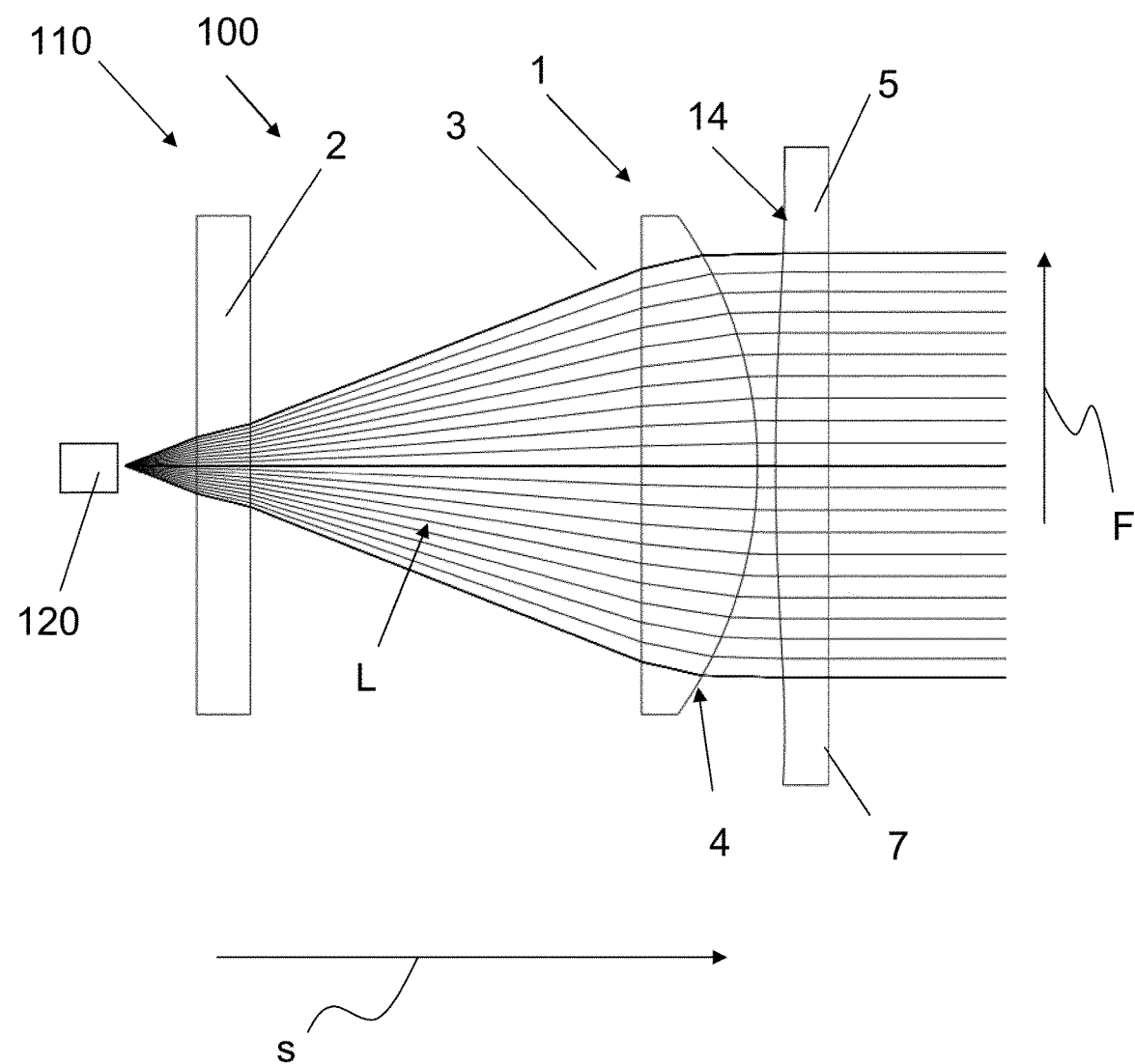
Figure 2:
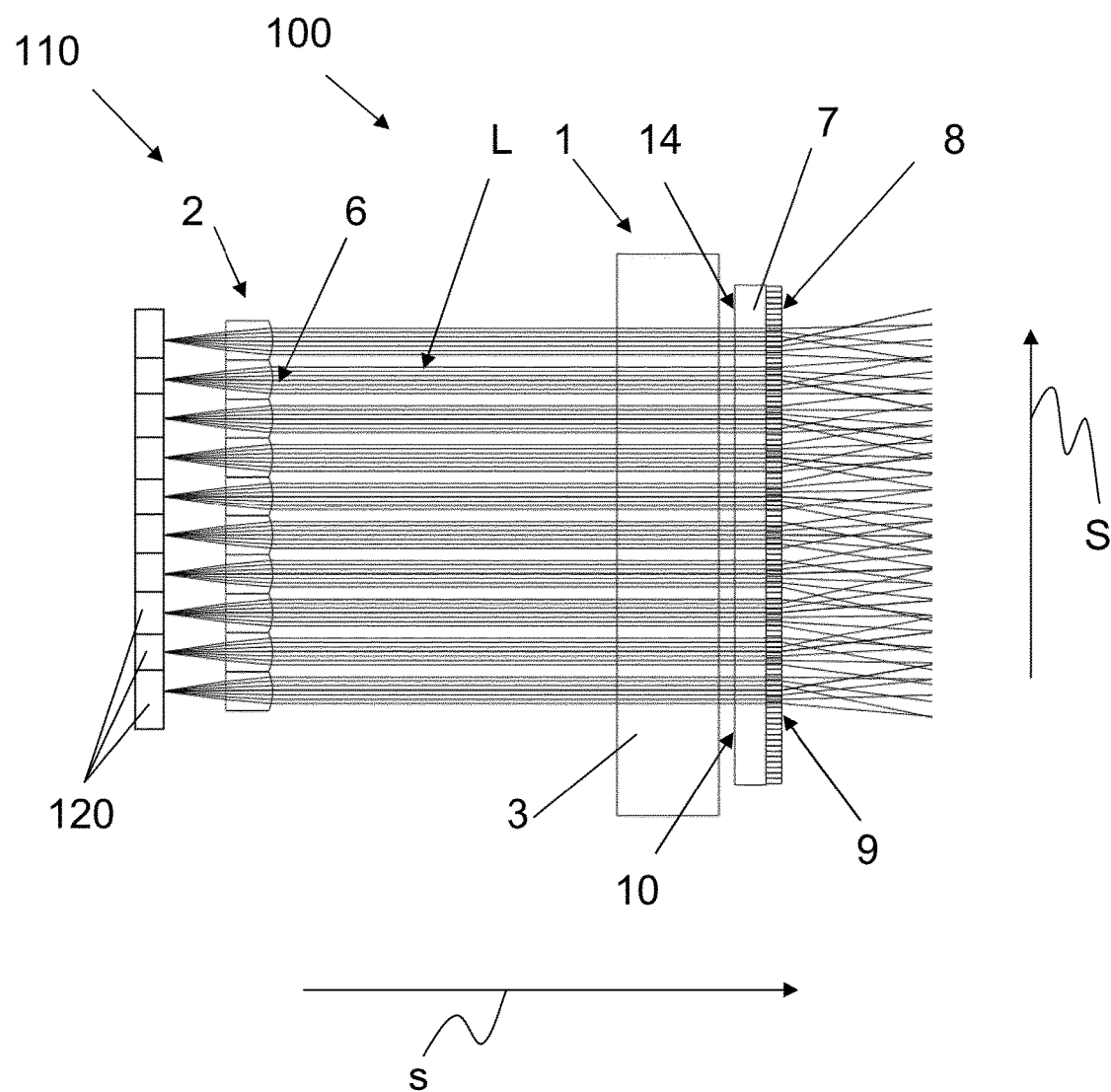
Figure 3:
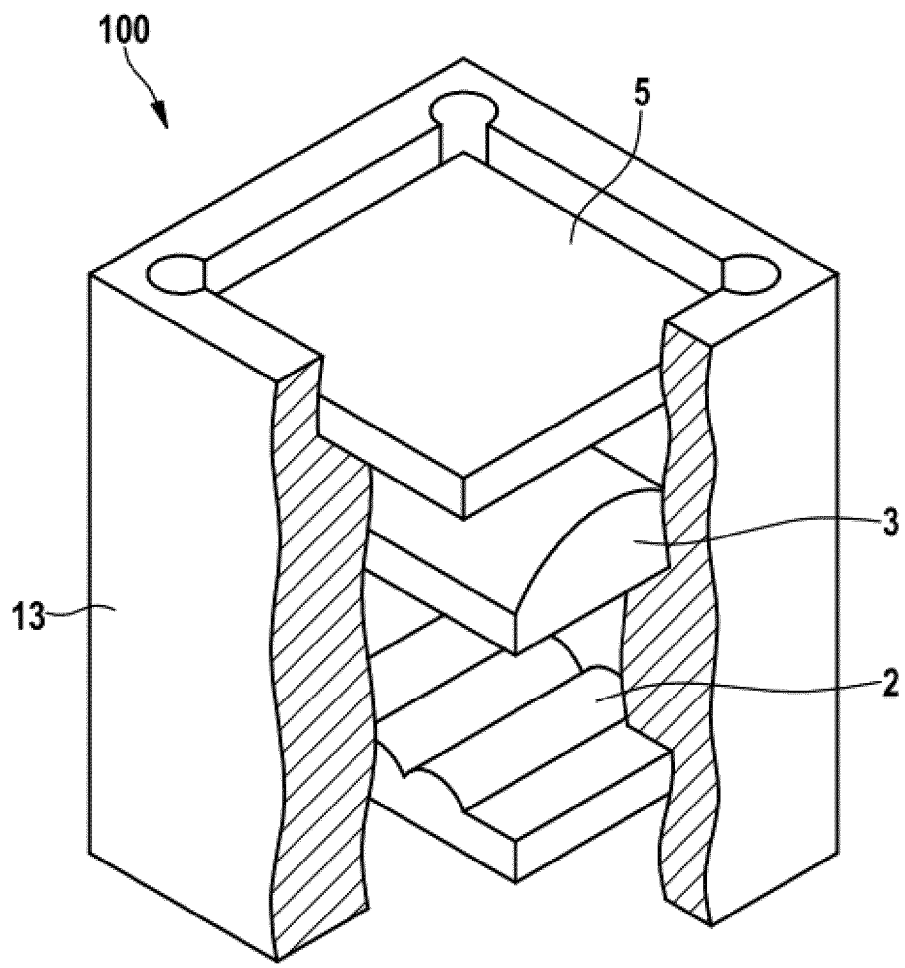
FIG. 3 shows a schematic representation of the device 100 according to the invention in a first perspective view.
Figure 4:
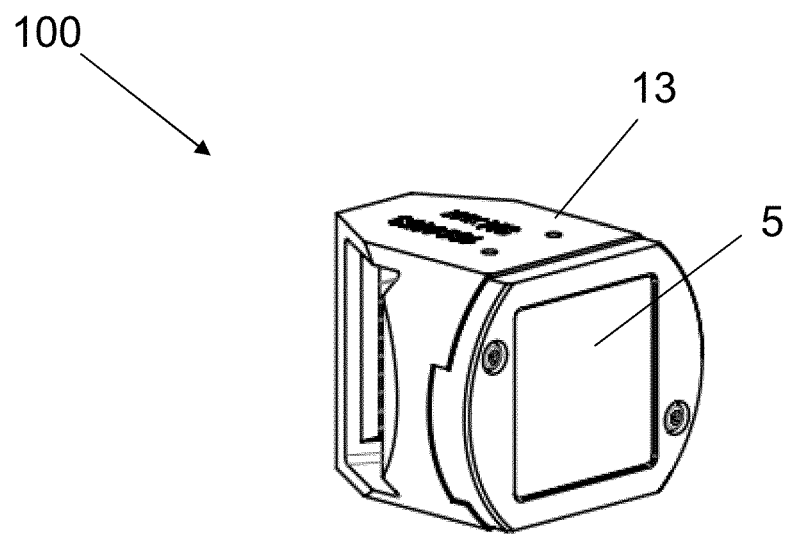
FIGS. 4 and 5 show a second and third perspective view of the device 100 according to the invention.
Figure 5:
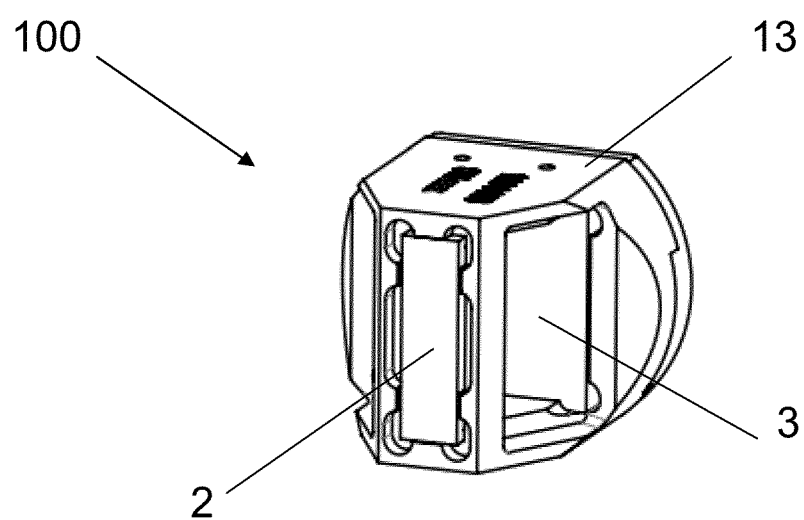

The device 100 can be coupled to an emitter. This consists, for example, of a stack of several laser diode chips with a wavelength of about 900 nm.

For a LIDAR system, for example, the measuring range should cover a distance between 1.5 m and 180 m. In this range, the light beam field in the fast axis should diverge only to a limited extent. In the slow axis, a homogeneous diverging light beam field is to be generated so that a linear measuring field is created. Immediately after emerging from the socket, the light beam should be approximately 25 mm×25 mm.

The focal length of the first collimating lens system 1 is preferably chosen so that the beam width is achieved without any further optical element, e.g. a telescope.

In horizontal direction a divergence of about 0.1°-0.2° is allowed, in vertical direction a divergence of 23.5°-24.5° is allowed.

The light beam field should meet these tolerances in a temperature range between −40° C. and 105° C. For this purpose, the optics must be athermal in this range.

This can be ensured with a cylindrical lens 3 made of glass and an aspherical lens element 5 made of plastic.

The device 100 comprises a mount 13 in which the second collimation lens system 2, the cylindrical lens 3 and the aspherical lens element 5 are mounted.

Figure 6:
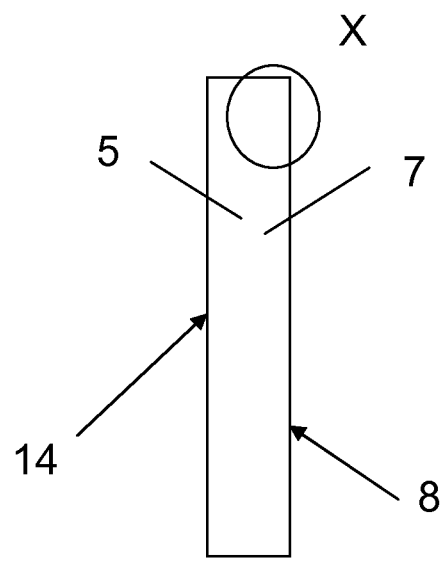
Figure 7:
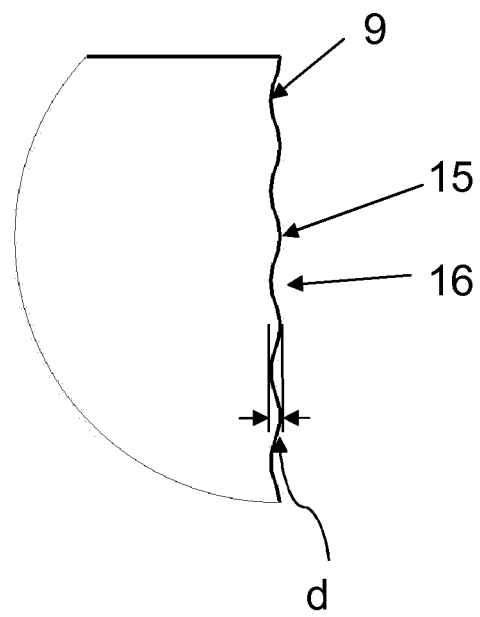

FIG. 6 shows a schematic representation of another optical element 7 in side view and FIG. 7 a detailed view X from FIG. 6.

The aspherical element 5 and the further optical element 7 can be formed as one element. The surface 14 facing the cylindrical lens 3, which is not shown, is designed as a free-form surface and is used for collimation.

The surface 8 facing away from the cylindrical lens 3 not shown serves for homogenisation.

For this purpose, the surface has a profile 9 in which convex areas 15 and concave areas 16 alternate.

The profile has a height difference d between 0.5 mm and 1 mm.

The invention claimed is:

1. A device for collimating a light beam field which diverges more quickly with respect to a direction of emission in a first direction perpendicular to the direction of emission than in a second direction perpendicular to the direction of emission and to the first direction, the device comprising:

at least one first collimation lens system for collimating the light beam field in the first direction, wherein the first collimation lens system comprises a cylindrical lens, and said first collimation lens system comprises an aspherical lens element made from plastic.

2. The device according to claim 1, wherein the device comprises a second collimation lens system for collimating the light beam field in the second direction, which comprises a cylindrical lens array.

3. The device according to claim 1, wherein the aspherical lens element is arranged after the cylindrical lens in the direction of emission, and wherein the cylindrical lens is made from glass.

4. The device according to claim 1, the device comprising an optical element which is arranged after the cylindrical lens in the direction of emission, wherein the cylindrical lens is of glass.

5. The device according to claim 1, wherein the optically effective surface of the aspherical lens element faces the cylindrical lens.

6. The device according to claim 4, wherein the aspherical lens element is formed as an integral part of the optical element.

7. The device according to claim 4, wherein the optical element comprises a lens array.

8. The device according to claim 4, wherein the optical element is produced in an injection mold.

9. The device according to claim 4, wherein the optical element has a surface facing the cylindrical lens, a contour of which can be described by the formula $$z(x) = \frac{\frac{x^2}{R}}{1 + \sqrt{1 - (1+k)\frac{x^2}{R^2}}} + \sum_{n=1}^{N} A_n \cdot x^n.$$

10. The device according to claim 1, said device comprising a mount to which the first collimation lens system is mounted.

11. The device according to claim 10, wherein an coefficient of thermal expansion ($\alpha_h$) of the mount is equal to an coefficient of thermal expansion ($\alpha_f$) of the first collimation lens system.

12. The device according to claim 1, wherein the cylindrical lens is made from glass and has a focal length greater than 30 mm.

13. The device according to claim 1, the aspherical lens element has a focal length of more than 200 mm.

14. A diode laser, comprising a laser diode and a device according to claim 1.

15. A method for collimating a light beam field which diverges more quickly with respect to a direction of emission in a first direction, perpendicular to the direction of emission, than in a second direction, perpendicular to the direction of emission and to the first direction, and the light beam field being collimated in the first direction by at least one first collimation lens system,
wherein the first collimation lens system comprises a cylindrical lens, which is made of glass, and
the first collimation lens system comprises an aspherical lens element which is made of plastic.

16. The method of manufacturing a device for collimating a light beam field, which diverges more quickly with respect to a direction of emission in a first direction perpendicular to the direction of emission than in a second direction, perpendicular to the direction of emission and to the first direction, the method comprising the following steps
providing at least one first collimation lens system for collimating the light beam field in the first direction, and the first collimation lens system comprises a cylindrical lens, which is made of glass, and an aspherical lens element, which is made of plastic, and
mounting the collimation lens system in a mount.

17. The device according to claim 1, wherein the aspherical lens element is made from one of polycarbonate, Zeonex E48R or Zeonex T62R.

18. The device according to claim 1, wherein the cylindrical lens is made from glass and has an at least partially circular profile.

19. The device according to claim 2, wherein the cylindrical lens array of the second collimation lens system is arranged, in the direction of emission, in front of the first collimation lens system.

20. The device according to claim 1, wherein the cylindrical lens is made from glass and has a focal length between 30 and 35 mm.

21. The device according to claim 1, wherein the optical device has a surface, on a side facing away from the cylindrical lens, which serves to homogenize the light beam field.

22. The device according to claim 10, wherein the mount, in which the first collimation lens system is mounted, comprises parts made of zinc die-cast or plastic.

23. The method for collimating the beam field according to claim 15, wherein the light beam field is collimated in the second direction by at least one second collimation lens system.

24. The method for collimating the beam field according to claim 15, wherein the cylindrical lens has an at least partially circular profile.

* * * * *